United States Patent [19]

Ishikawa et al.

[11] Patent Number: 4,983,957
[45] Date of Patent: Jan. 8, 1991

[54] ELECTROCHROMIC DISPLAY DEVICE CAPABLE OF DISPLAY IN PLURAL COLORS

[75] Inventors: Masazumi Ishikawa, Yokosuka; Yasuhiko Osawa, Tokyo; Hiroshi Inaba, Matsusaka; Kiyoshi Nakase, Mie; Yukitoshi Yanagida, Matsusaka, all of Japan

[73] Assignee: Nissan Motor Co., Ltd., and Central Glass Company, Limited., Yokohoma City and Ube City, Japan

[21] Appl. No.: 196,715

[22] Filed: May 20, 1988

[30] Foreign Application Priority Data

May 29, 1987 [JP] Japan .................... 62-131286

[51] Int. Cl.$^5$ .................... G09G 3/34
[52] U.S. Cl. .................... 340/785; 340/787; 350/357
[58] Field of Search ............ 340/785, 783, 786, 787; 350/357; 252/600

[56] References Cited

U.S. PATENT DOCUMENTS

| | | | |
|---|---|---|---|
| 4,194,812 | 3/1980 | Hara et al. | 350/357 |
| 4,346,964 | 8/1982 | Ishihama et al. | 340/785 |
| 4,451,498 | 5/1984 | Hashimoto et al. | 350/357 |
| 4,465,339 | 8/1984 | Bancke et al. | 350/357 |
| 4,482,216 | 11/1984 | Hashimoto et al. | 350/357 |
| 4,565,860 | 1/1986 | Murofushi et al. | 528/422 |
| 4,645,307 | 2/1987 | Miyamoto et al. | 350/357 |
| 4,652,090 | 3/1987 | Uchikawa et al. | 350/357 |
| 4,801,195 | 1/1989 | Kawai et al. | 350/357 |

FOREIGN PATENT DOCUMENTS

| | | | |
|---|---|---|---|
| 0005300 | 1/1977 | Japan | 340/785 |
| 59-159134 | 9/1984 | Japan | |

Primary Examiner—Alvin E. Oberley
Assistant Examiner—M. Fatahiyar
Attorney, Agent, or Firm—Foley & Lardner, Schwartz, Jeffery, Schwaab, Mack, Blumenthal & Evans

[57] ABSTRACT

In an electrochromic (EC) display device having oppositely arranged two EC electrode layers, two kinds of EC materials each of which takes on a characteristic color by electrochemical oxidation, or by electrochemical reduction, are used in the two EC electrode layers, respectively, on condition that the characteristic color of one EC material differs from the color of the other EC material. For example, Prussian blue which colors in blue by oxidation and polytriphenylamine which colors in bronze by oxidation are used in combination. An alternative example is using a combination of $WO_3$ which colors in blue by reduction and $V_2O_5$ which colors in green by reduction. Since electrochemical oxidation of one EC electrode layer is usually accompanied by reduction of the opposite EC electrode layer, this EC device can be operated so as to selectively and alternately exhibit at least two different colors aside from colorless transparency.

7 Claims, 1 Drawing Sheet

ELECTROCHROMIC DISPLAY DEVICE CAPABLE OF DISPLAY IN PLURAL COLORS

BACKGROUND OF THE INVENTION

This invention relates to an electrochromic display device, which utilizes a combination of two kinds of electrochromic materials and can be operated so as to selectively and alternately exhibit at least two different colors aside from colorless transparency.

Electrochromic (EC) display devices utilize reversible coloring and bleaching that accompany reversible electrochemical oxidation and reduction of selected materials. Compared with liquid crystal display devices, EC display devices have advantages such as no need of polarizing plate, viewability from any angle and clearer coloration.

Conventional EC materials are classified into two types, which will be referred to as "oxidation coloring type" and "reduction coloring type", respectively, in the present specification. An EC material of the oxidation coloring type takes on color in its electrochemically oxidized state, whereas an EC material of the reduction coloring type takes on color in its electrochemically reduced state.

It is known to use a combination of an oxidation coloring type EC material and a reduction coloring type EC material in an EC display device having oppositely arranged two electrode layers. The two types of EC materials are assigned to the two electrode layers, respectively. For example, JP-A No. 59-159134 shows using a combination of Prussian blue which assumes blue color in its electrochemically oxidized state and becomes colorless by reduction and tungsten trioxide which is colorless in its electrochemically oxidized state and assumes blue color in a reduced state. In operation of the display device, electrochemical oxidation of the EC material of one electrode is accompanied by electrochemical reduction of the EC material of the opposite electrode. Accordingly simultaneous coloration of the two electrodes and simultaneous bleaching of the two electrodes take place. The primary purpose of this construction is intensifying blue coloration of the display device.

There is an increasing demand for EC display devices that can exhibit at least two different colors, but the demand has not been met from an industrial point of view. There is a proposal of using a combination of two kinds of organic dyes one of which belongs to the oxidation coloring type and the other to the reduction coloring type. However, EC devices using such dyes are deemed impracticable because of insufficient stability and poor endurance to repeated driving.

SUMMARY OF THE INVENTION

It is an object of the present invention to provide an EC display device which can be operated so as to selectively and alternately exhibit two or more different colors and is fully practicable in respect of both stability and service life.

An EC display device according to the invention comprises a transparent first substrate laid with a transparent electrode layer, a second substrate which comprises an electrode layer and is held opposite to and spaced from the first substrate such that the electrode layers of the respective substrates are opposite to each other, a first electrochromic layer formed on the electrode layer of the first substrate, a second electrochromic layer formed on the electrode layer of the second substrate and an electrolyte liquid which fills up the space between the two substrates. As the principal feature of the invention, the first and second electrochromic layers are formed of two kinds of electrochromic materials of the oxidation coloring type or two kinds of electrochromic materials of the reduction coloring type, respectively, on condition that the color of one of the two EC materials in its electrochemically oxidized state, or reduced state, differs from the color of the other EC material in its electrochemically oxidized, or reduced, state.

In operating an EC display device according to the invention in the usual manner, i.e by applying a voltage between the oppositely arranged two electrodes, one of the two EC layers assumes electrochemically oxidized state while the opposite EC layer assumes electrochemically reduced state. Using this principle and two differently coloring EC materials of the same type, the present invention has succeeded in making display in plural colors.

For explanation, assume that an EC display device according to the invention uses two kinds of EC materials, $E_1$ and $E_2$, of the reduction coloring type, that the EC material $E_1$ takes on color $C(R)_1$ in its electrochemically reduced state and another color $C(O)_1$ (usually colorless transparency) in its electrochemically oxidized state and that the EC material $E_2$ takes on color $C(R)_2$ in its electrochemically reduced state and another color $C(O)_2$ (usually colorless transparency) in its electrochemically oxidized state. When the EC layer of $E_1$ is in oxidized state this EC layer assumes the color $C(O)_1$ whereas the opposite EC layer of $E_2$ is in reduced state and accordingly assumes the color $C(R)_2$, so that the display device as a whole exhibits a mixed color $COL(1)=(C(O)_1+C(R)_2)$. When the EC layer of $E_1$ is reduced the color of this EC layer changes to $C(R)_1$ whereas the opposite EC layer of $E_2$ is oxidized to change its color to $C(O)_2$, so that the display device as a whole exhibits a mixed color $COL(2)=(C(R)_1+C(O)_2)$ Thus, this EC display device can selectively and alternately exhibit the two different colors $COL(1)$ and $COL(2)$, and also colors intermediate between these two colors. When both $E_1$ and $E_2$ become colorless by electrochemical oxidation, meaning that $C(O)_1$ and $C(O)_2$ are actually colorless, the colors $COL(1)$ and $COL(2)$ are identical with $C(R)_2$ and $C(R)_1$, respectively.

It will readily be understood that similar characteristics are obtained also by using two kinds of EC materials of the oxidation coloring type in the EC display device.

Typical examples of EC materials of the reduction coloring type are $WO_3$ (which assumes blue color in electrochemically reduced state), $V_2O_5$ (green color), $TiO_2$ (grayish green color), $MoO_3$ (blue color), $Nb_2O_5$ (dark blue color), mixture of $WO_3$ and Au (red color) and mixture of $WO_3$ and $MoO_3$ (black color). Typical examples of EC materials of the oxidation coloring type are Prussian blue (which assumes blue color in electrochemically oxidized state), polytriphenylamine disclosed in U.S. Pat. No. 4,565,860 (bronze color), $Rh(OH)_x$ (reddish brown color), $Ir(OH)_x$ (black color), $Ni(OH)_x$ (dark blue color) and osmium purple represented by the formula $Fe^{2+}_4[Os^{II}(CN)_6]_3$ (purple color). Various colors can be exhibited by suitably selecting two kinds of EC materials from either of these two groups.

Besides the capability of making display in plural colors, a merit of an EC display device according to the invention, in which two kinds of EC materials of the oxidation coloring type or two kinds of EC materials of the reduction coloring type are used in a pair, is that the reversible oxidation and reduction reactions can be carried out very stably. Accordingly this EC display device possesses improved endurance to repeated coloration and bleaching. The invention is applicable to various display boards and also to variable light transmittance glass boards.

DESCRIPTION OF THE PREFERRED EMBODIMENTS

Figure 1:
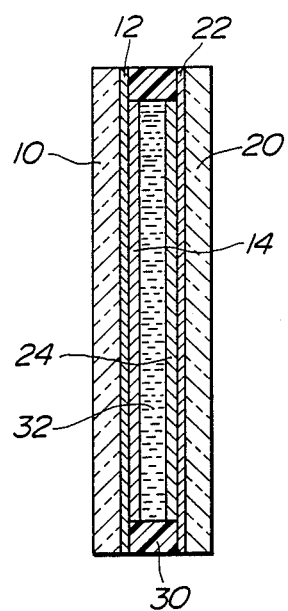
FIG. 1 is a sectional view of an EC display device as an embodiment of the present invention.

FIG. 1 shows a fundamental construction of an EC display device according to the invention. The device has front and back substrates 10 and 20 both of which are of transparent glass in this embodiment. A transparent electrode film 12 is deposited on the inside surface of the front substrate 10, and a first EC layer 14 is formed on the electrode film 12. Another transparent electrode film 22 is deposited on the inside surface of the back substrate 20, and a second EC layer 24 is formed on this electrode film 22. The transparent electrode films 12, 22 are usually formed of $SnO_2$ and/or $In_2O_3$ by using a PVD method such as sputtering or vacuum evaporation or a CVD method. Two kinds of EC materials are used for the first and second EC layers 14 and 24, respectively. Both of the two kinds of EC materials are of the oxidation coloring type, or of the reduction coloring type, on condition that the characteristic color of one EC material differs from the characteristic color of the other EC material.

The two substrates 10 and 20 are held spaced from and parallel to each other by a thin layer 30 of a sealing material, which is applied peripherally of the substrates 10, 20 so as to surround the EC layers 14, 24. The space defined between the two substrates 10 and 20 is filled with an electrolyte liquid 32.

In an EC device according to the invention at least one of the two substrates 10 and 20 and the conductive film (12, 22) formed thereon must be transparent. However, the opposite substrate and the conductive film thereon may be opaque and reflective. The material of the transparent substrate(s) is not limited to colorless glass sheet and may alternatively be a palely colored glass sheet or a transparent synthetic resin plate. Examples of opaque substrate materials are opaquely colored glasses, ceramics, colored synthetic resins and metals such as stainless steel, Ti or Ni. In the case of a metal substrate the EC layer (14 or 24) can be formed directly on the substrate surface since the substrate surface serves the function of the electrode film (12 or 22).

EXAMPLE 1

An EC display device of the construction shown in FIG. 1 was produced by using the following materials.

As the first EC layer 14, a film of Prussian blue represented by the formula $Fe^{III}_4[Fe^{II}(CN)_6]_3$ was formed to a thickness of about 4000 Å by an electrodeposition method. As the second EC layer 24, a film of straight chain polytriphenylamine was formed to a thickness of about 4000 Å by an electrolytic polymerization deposition method. In both cases masking was made along the periphery of the transparent electrode film 12, 22. After that the peripheral seal layer 30 was formed by using butyl rubber and Thiokol rubber so as to hold the two substrates 10 and 20 at a distance of about 1 mm from each other. The electrolyte liquid 32 was a solution prepared by dissolving 1 mol of $LiClO_4$ in 1 liter of propylene carbonate.

Initially, the Prussian blue layer 14 was in an electrochemically oxidized state and accordingly assumed blue color, whereas the polytriphenylamine layer 24 was in an electrochemically reduced state and accordingly was colorless and transparent. Therefore, the EC device as a whole was colored in blue.

In this state, a DC voltage of 0.6 V was applied to the EC device with the polytriphenylamine electrode (22, 24) positive electrode and the Prussian blue electrode (12, 14) negative. Then, in about 5 sec. the polytriphenylamine layer 24 took on bronze color whereas the Prussian blue layer 14 lost its blue color and became colorless and transparent. Therefore, the EC device as a whole exhibited bronze color. When this test was modified by decreasing the magnitude of the applied DC voltage to 0.3 V, the EC device exhibited yellowish green color.

To the EC device exhibiting bronze color, a DC voltage of 0.2 V was applied with the Prussian blue electrode (12, 14) positive and the polytriphenylamine electrode (22, 24) negative. In about 5 sec, the Prussian blue layer 14 colored in blue whereas the polytriphenylamine layer 24 lost bronze color and became colorless and transparent. That is, the device reverted to the initial state. When this test was modified by decreasing the magnitude of the applied voltage to 0.1 V the EC device exhibited yellowish green color.

Thus, the EC display device of Example 1 was capable of selectively and alternately exhibiting three different colors, blue, yellowish green and bronze, with good stability of every display color.

Figure 2:
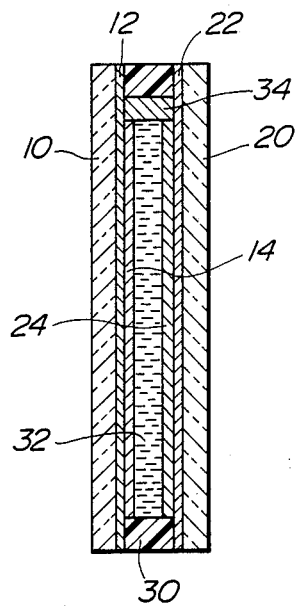
FIG. 2 is a sectional view of an EC display device which is fundamentally similar to the device of FIG. 1 but additionally includes an auxiliary electrode.

Referring to FIG. 2, an EC display device according to the invention may optionally has an auxiliary electrode 34 which is disposed in a marginal region of the space between the two substrates 10 and 20. Aside from the addition of this electrode 34, the device of FIG. 2 is identical with the device of FIG. 1. Usually the body of the auxiliary electrode 34 is made of an electrochemically oxidizable and reducible material, and the electrode 34 has an insulating covering which is permeable to ions. That is, the auxiliary electrode 34 is electrically insulated from the conductive films 12 and 22 though the electrode 34 is adjacent to the films 12, 22.

EXAMPLE 2

An EC display device of the construction shown in FIG. 2 was produced by adding the auxiliary electrode 34 to the EC device of Example 1. The auxiliary electrode 34 was produced by the steps of mixing potassium ferricyanide powder with ferrous chloride powder and further with carbon powder and Teflon dispersion liquid, pressing the resultant mixture onto a titanium meshwork used as an electrochemically inactive support, and covering the obtained electrode body with a nonwoven cloth of a synthetic resin.

Without using the auxiliary electrode 34, the EC device could be operated so as to selectively and alternately exhibit blue color, yellowish green color and bronze color as explained in Example 1. By using the auxiliary electrode 34 while the Prussian blue layer 14 assumed blue color to apply a DC voltage of about 0.7 V with the auxiliary electrode 34 positive and the Prussian blue electrode (12, 14) negative, the Prussian blue layer 14 lost its blue color and became colorless and transparent while the polytriphenylamine layer 24 remained colorless and transparent. Therefore, the EC device as a whole became colorless and transparent. By succeedingly applying a DC voltage of about 0.2 V with the Prussian blue electrode (12, 14) positive and the auxiliary electrode 34 negative, the Prussian blue layer 14 resumed blue color so that the EC device reverted to the initial state.

By using the auxiliary electrode 34 while the polytriphenylamine layer 24 assumed bronze color to apply a voltage between the auxiliary electrode 34 and the polytriphenylamine electrode (22, 24), also it was possible to render the EC device colorless and transparent.

Besides the use for rendering the EC display device colorless and transparent at a desired moment, the auxiliary electrode 34 is of use for extending service life of the EC display device by an electrochemical treatment which will be made, when the balance of oxidation and reduction of the EC materials is lost after long repeating the coloring and bleaching reactions, to resume the balance.

Figure 3:
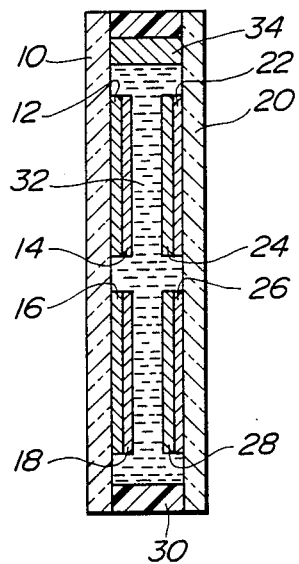
FIG. 3 is a sectional view of an EC display device as another embodiment of the invention.

FIG. 3 shows another EC display device according to the invention in which a combination of two kinds of EC materials of the oxidation coloring type and, in addition, a combination of two kinds of EC materials of the reduction coloring type are used. In this device the first EC layer 14 described hereinbefore and the underlying conductive film 12 are formed only in an upper half area of the substrate 10, and the second EC layer 24 described hereinbefore and the underlying conductive film 22 are formed only in an upper half area of the substrate 20. In a lower half area the inside surface of the substrate 10 is laid with another transparent conductive film 16, and a third EC layer 18 is formed on the conductive film 16 by using an EC material of the reduction coloring type. In the opposite area the inside surface of the substrate 20 is laid with a transparent and conductive film 26, and a fourth EC layer 28 is formed on this conductive film 26 by using another EC material of the reduction coloring type. The coloring characteristics of this EC device will be explained in the following example.

EXAMPLE 3

The upper part of the EC display device of FIG. 3 was produced in accordance with Example 1 by using Prussian blue and polytriphenylamine in the first and second EC layers 14 and 24, respectively. The auxiliary electrode 34 was provided in accordance with Example 2.

As the third EC layer 18 a film of $V_2O_5$ was formed by a PVD method. As the fourth EC layer 28 a film of $WO_3$ was formed by a PVD method.

As described in Examples 1 and 2, the upper half part of this EC display device could selectively and alternately exhibit blue color, yellowish green color and bronze color and could be rendered colorless and transparent by using the auxiliary electrode 34.

In the lower half part, initially the $V_2O_5$ layer 18 was in electrochemically oxidized state and assumed pale yellow color, and the $WO_3$ layer 28 too was in electrochemically oxidized state, i.e. in colorless and transparent state. For effective coloration and bleaching, it was necessary to first accomplish electrochemical reduction of one of the third and fourth EC layers 18 and 28. As such a reduction treatment, a DC voltage of $+1.0$ V was applied between the auxiliary electrode 34 and the $V_2O_5$ electrode (16, 18) with the auxiliary electrode 34 positive. The $V_2O_5$ layer 18 was reduced and colored in green. Since the $WO_3$ layer 28 remained colorless and transparent, the lower half part of the EC device exhibited green color. In this state a DC voltage of $+1.0$ V was applied between the $V_2O_5$ electrode (16, 18) and the $WO_3$ electrode (26, 28) with the $V_2O_5$ positive. Then the $V_2O_5$ layer 18 was oxidized to change its color to pale yellow, whereas the $WO_3$ layer 28 was reduced to color in blue. Therefore, the lower part of the EC device exhibited greenish blue color. In this state the auxiliary electrode 34 was used to oxidize the $WO_3$ layer 28 without affecting the $V_2O_5$ layer 18. As the result the $WO_3$ layer 28 became colorless and transparent, whereby the lower part of the EC device assumed a pale yellow color close to colorless transparency.

Thus, the lower part of this EC display device was capable of selectively exhibiting green color, greenish blue color, and pale yellow color, and such changes in color of the lower part could be made independently of the color changes in the upper part using the oxidation coloring type EC materials.

What is claimed is:

1. An electrochromic device, comprising;
    a transparent first substrate laid with a transparent electrode layer;
    a second substrate which comprises an electrode layer and is arranged opposite to and spaced from the first substrate such that the electrode layers of the respective substrates are opposite to each other;
    a first electrochromic layer which is formed on the electrode layer of the first substrate and is formed of a first electrochromic material selected from a group of materials of a particular coloring type and which takes on a characteristic first color in its electrochemically fully oxidized state;
    a second electrochromic layer which is formed on the electrode layer of the second substrate and is formed of a second electrochromic material selected from said group of materials and which takes on a characteristic second color different from said first color in its electrochemically fully oxidized state;
    seal means for holding the first and second substrates in the opposite and spaced arrangement and airtightly defining a space between the first and second substrates; and
    an electrolyte liquid which fills up the space defined between the first and second substrates.

2. A device according to claim 1, wherein said group consists of Prussian blue, polytriphenylamine, $Rh(OH)_x$, $Ni(OH)_x$ and osmium purple.

3. A device according to claim 1, further comprising an auxiliary electrode which is disposed in a marginal region of the space defined between the first and second substrates and is electrically insulated from the electrode layers of the first and second substrates.

4. A device according to claim 1, further comprising an additional transparent electrode layer formed on the first substrate, a third electrochromic layer which is formed on the additional electrode layer and is formed of a third electrochromic material selected from said group of materials and which takes on a characteristic third color in its electrochemically fully reduced state, and additional electrode layer formed on the second substrate and a fourth electrochromic layer which is formed on the additional electrode layer of the second substrate and is formed of a fourth electrochromic material selected from said group of materials and which takes on a characteristic fourth color different from said third color in its electrochemically fully reduced state.

5. A device according to claim 4, wherein said third said fourth electrochromic materials are selected from the group consisting of $WO_3$, $V_2O_5$, $TiO_2$, $MoO_3$, $Nb_2O_5$, mixture of $WO_3$ and Au, and mixture of $WO_3$ and $MoO_3$.

6. An electrochromic device, comprising:
   a transparent first substrate laid with a transparent electrode layer;
   a second substrate which comprises an electrode layer and is arranged opposite to and spaced from the first substrate such that the electrode layers of the respective substrates are opposite to each other;
   a first electrochromic layer which is formed on the electrode layer of the first substrate and is formed of a first electrochromic material selected from a group of materials of a particular coloring type and which takes on a characteristic first color in its electrochemically fully reduced state;
   a second electrochromic layer which is formed on the electrode layer of the second substrate and is formed of a second electrochromic material selected from said group of materials and which takes on a characteristic second color different from said first color in its electrochemically fully reduced state;
   seal means for holding the first and second substrates in the opposite and spaced arrangement and airtightly defining a space between the first and second substrates;
   an electrolyte liquid which fills up the space defined between the first and second substrates; and
   an auxiliary electrode which is disposed in a marginal region of the space defined between the first and second substrates and which is electrically insulated from the electrode layers of the first and second substrates.

7. A device according to claim 6, wherein said first and second electriochroimic materials are selected from the group consisting of $WO_3$, $V_2O_5$, $TiO_2$, $MoO_3$, $Nb_2O_5$, mixture of $WO_3$ and AU, and mixture of $WO_3$ and $MoO_3$.

* * * * *